2,813,907
PRODUCTION OF ARALKYL HYDROPEROXIDES

Johannes C. Vlugter, Amsterdam, Netherlands, assignor to Shell Development Company, New York, N. Y., a corporation of Delaware No Drawing. Application September 19, 1955,
Serial No. 535,271

Claims priority, application Netherlands October 6, 1954

7 Claims. (Cl. 260—610)

This invention relates to improvements in the production of aralkyl hydroperoxides. The invention relates more particularly to improvements in the production of aralkyl hydroperoxides by the oxidation of aromatic hydrocarbons containing an alkyl group which is directly attached to the aromatic nucleus by means of a tertiary carbon atom.

The aralkyl hydroperoxides, such as, for example, the isopropyl benzene hydroperoxides, are of importance in many fields of application. They are employed as catalysts and initiators in the execution of many organic reactions, such as, for example, polymerization and oxidation of unsaturated compounds. They are potential starting materials for the production of valuable derivatives therefrom, such as, for example, phenols and ketones. Thus, isopropyl benzene hydroperoxide (cumene hydroperoxide) in the presence of acid catalysts undergoes cleavage to reaction products comprising phenol and dimethyl ketone.

The aralkyl hydroperoxides, such as, for example, the hydroperoxides of the alkyl substituted benzenes, to the production of which the present invention is directed, are obtained by the oxidation of the corresponding aromatic hydrocarbons as exemplified by the following empirical formula:

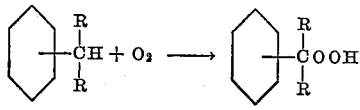

in which at least one R is a hydrocarbyl radical selected from the group consisting of alkyl and cycloalkyl radicals and one R, if not a hydrocarbyl radical, is hydrogen. One or more replaceable hydrogen atoms of the benzene nucleus may be substituted by an aliphatic radical, such as, for example, alkyl and cycloalkyl radicals.

The above defined aromatic hydrocarbons from which the corresponding hydroperoxides are derived may be referred to as alpha-alkyl substituted methylbenzene hydrocarbons comprising the the alkyl substituted methylbenzene hydrocarbons having one or two alkyl, or cycloalkyl, radicals attached to the alpha carbon atom. The hydroperoxides obtained from the above defined aralkyl hydrocarbons may be referred to as alpha-alkyl substituted methylbenzene hydroperoxides. These hydroperoxides, it is seen, comprise the hydroperoxides of alkyl substituted methyl benzenes in which the hydroperoxide group (—OOH) is linked directly to an aliphatic carbon atom which in turn is directly attached by a single bond to a nuclear carbon atom in the benzene ring. A particularly valuable sub-group of the above defined broad class of aralkyl hydroperoxides, prepared in accordance with the invention, comprises that wherein the hydroperoxide group is linked directly to a tertiary carbon atom, that is the alpha, alpha-dialkyl substituted benzyl hydroperoxides obtained by the oxidation of the corresponding alpha, alpha-dialkyl substituted methylbenzenes. Of especial importance are the alpha, alpha-dimethyl benzyl hydroperoxides, also known as isopropyl benzene hydroperoxides, the lowest member of which is alpha, alpha-dimethyl hydroperoxide, also known as isopropyl benzene hydroperoxide or cumene hydroperoxide, obtained by the oxidation of isopropyl benzene.

The oxidation step itself, wherein the aralkyl hydrocarbons are oxidized to the corresponding hydroperoxide, may be carried out under conditions comprising those disclosed heretofore in the prior art. Thus, molecular oxygen or an oxygen containing gas, such as, for example, air, may be passed through the aralkyl hydrocarbon under conditions at which at least a substantial part of the hydrocarbon charge is in the liquid phase. Temperatures employed comprise, for example, those ranging from about room temperature, and preferably from at least 50° C., to the boiling temperature of the aralkyl hydrocarbon being oxidized, which in the case of isopropyl benzene is 152° C. In general, it is preferred to employ temperatures above about 100° C., for example, in the range of from about 110° to 130° C. Higher or lower temperatures may, however, be employed within the scope of the invention. The specific temperature preferably employed may vary in accordance with the specific hydrocarbon being oxidized and the specific operating conditions employed. Pressures comprising atmospheric and slightly sub-atmospheric pressures up to, for example, about 100 pounds are generally satisfactory.

It will be understood from the following that the invention, directed to the production of the aralkyl hydroperoxide, is in nowise limited by specific conditions employed in the oxidation step itself of the process. In a preferred method of oxidizing the aralkyl hydrocarbon charge a promoter is employed, such as, for example, pyridine as disclosed and claimed in co-pending application Serial No. 281,682, filed April 10, 1952, now U. S. Patent 2,734,086, issued February 7, 1956. The oxidation is further preferably carried out in the presence of metallic copper as disclosed and claimed in co-pending application Serial No. 274,842, filed March 4, 1952, now U. S. Patent 2,730,550, issued January 10, 1956.

Under the above defined conditions, the aralkyl hydrocarbon charge is converted to reaction products comprising the above defined aralkyl hydroperoxides corresponding to the specific aralkyl hydrocarbon charged, isopropyl benzene being converted to isopropyl benzene hydroperoxide.

Production of the desired aralkyl hydroperoxides by such direct oxidation is often handicapped by difficulties militated against efficient large scale operation of the process. These difficulties are generally evidenced by a yield substantially below that commensurate with efficient practical scale operation.

It has now been found that these difficulties heretofore encountered in the production of the desired aralkyl hydroperoxides by direct oxidation of the corresponding aralkyl hydrocarbons are obviated to at least a substantial degree by subjecting the aralkyl hydrocarbon charge to a pretreatment prior to the oxidation, in which pretreatment of the aralkyl hydrocarbon is brought into contact with a clay type cracking catalyst, preferably in the presence of a relatively small amount of added hydrocarbons comprising propylene, under conditions at which reaction of the added propylene with the nucleus of the aralkyl hydrocarbon comprising alkylation and dealkylation takes place.

The clay type cracking catalysts with which the aralkyl hydrocarbon charge is brought into contact during the pretreating stage of the process comprise broadly the silicious cracking catalysts heretofore disclosed as capable of promoting the conversion of higher boiling hydrocarbons to lower boiling hydrocarbons. The suitable catalysts comprise those consisting essentially of oxides of silicon in combination with alumina and/or zirconia and/or magnesia. The several components of the catalyst may be in physical admixture with the oxide of silicon, or they may be in chemical combination therewith in the form of silicates. In addition, the catalyst composition may comprise minor amounts of other compounds, such as, for example, the oxide of calcium, sodium, potassium, etc., present as such or in the form of silicates.

Other materials, such as, for example, water, oxides of carbon and of sulfur, may at times also be present in minor amounts in chemically bound form. Any water contained in the catalyst is generally present in a free, or only very loosely bound, form. Particularly preferred are the silica-alumina cracking catalysts of natural or synthetic origin consisting largely of oxide of silicon and alumina, an example of which is alumina deposited on silica. The preferred silica-alumina cracking catalysts employed in the pretreating step generally consists predominantly of $SiO_2$ and $Al_2O_3$. A number of other components, such as $Na_2$, $K_2O$, $CaO$, $MgO$, $ZrO_2$, $H_2O$, $CO_2$ and $SO_3$ may at times be present in trace amounts. Preferred catalysts usually have a higher $SiO_2$ than $Al_2O_3$ content, and may comprise, for example, from about 85 to about 90% by weight of $SiO_2$ and from about 15 to about 10% by weight of $Al_2O_3$.

Contact of the aralkyl hydrocarbon charge with the clay type cracking catalyst in the first, or pretreating, step of the process is executed under conditions resulting in reaction of propylene with the benzene nucleus of the aralkyl hydrocarbon as evidenced by the occurrence of both addition of propylene to the nucleus and removal of propylene from aralkyl substituted nuclei. The suitable conditions under which such simultaneous alkylation and dealkylation take place are obtained by the use of a temperature in the broad range of from about 150° to about 350° C. Contact of the aralkyl hydrocarbon charge with the clay type cracking catalyst within the above defined broad temperature range in the pretreating stage of the process may be carried out under conditions at which at least a substantial part of the aralkyl hydrocarbon is either in the vapor or the liquid phase.

When effecting the pretreatment under conditions at which at least a substantial part of the aralkyl hydrocarbon is maintained in the vapor phase, a temperature in the range of from about 180° to about 350° C., and preferably from about 180° to about 250° C., is generally employed. Pressures in the range of from about atmospheric to slightly elevated pressures, for example, up to about 150 pounds are satisfactory. The pretreatment in the vapor phase may be carried out by the passage of an aralkyl hydrocarbon through a pretreating zone, such as, for example, a zone of large cross-sectional area containing one or more beds of the clay type cracking catalyst.

In a preferred method of carrying out the process of the invention, the pretreatment is effected under conditions at which at least a substantial part of the aralkyl hydrocarbon is maintained in the liquid phase under a relatively high pressure. Such liquid phase conditions preferably comprise the use of a temperature in the range of from about 150° to about 300° C., and more preferably in the range of from about 160° to about 220° C. During the liquid phase pretreatment, pressures are maintained sufficiently high to assure the maintenance of at least a substantial part of the aralkyl hydrocarbon in the liquid phase during the pretreatment. High pressures, for example, in excess of about 500 and preferably in excess of about 750 pounds are employed. Contact of the clay type cracking catalyst with the aralkyl hydrocarbon charge during the liquid phase pretreatment may be brought about, for example, by suspension of the catalyst in the liquid aralkyl hydrocarbon undergoing pretreatment, by the passage of the hydrocarbon charge through a bed of the catalyst, by the passage of a slurry of the aralkyl hydrocarbon charge and catalyst through a suitable contacting zone, etc.

In carrying out the pretreatment, a relatively small amount of hydrocarbons comprising propylene is preferably introduced into the pretreating zone wherein the aralkyl hydrocarbon is brought into contact with the clay type cracking catalyst. The propylene thus introduced into the treating zone need not necessarily be pure propylene and may comprise, for example, a propylene-containing, normally gaseous hydrocarbon fraction. A surprising increase in efficiency in the subsequent oxidation of the treated aralkyl hydrocarbon is observed by such introduction of propylene into the pretreating zone. The substantial improvement in the oxidation, as evidenced by substantial increase in yield, is brought about by the use of the propylene in the pretreating zone in only exceedingly small amounts, for example, about 0.01% by weight of the aralkyl hydrocarbon. In general, the addition of propylene or propylene-containing hydrocarbons to the pretreating zone in the range of, for example, from about 0.01% to about 1% by weight of the aralkyl hydrocarbon is satisfactory. Somewhat higher proportions of the propylene may, however, be employed within the scope of the invention.

In carrying out the pretreatment, conditions are preferably controlled to obtain at least a substantial reaction of propylene with the aralkyl hydrocarbon without, however, incurring any substantial polymerization within the pretreating zone.

Conditions of pretreatment employed within the scope of the invention may comprise the presence of other reactants within the pretreating zone. Thus, the pretreating may be conducted under conditions enabling the simultaneous execution of other reactions catalyzed by the clay type cracking catalyst. Thus, alkylation, dealkylation, isomerization, etc., may be caused to take place simultaneously during the pretreatment in the pretreating zone. Thus, in the pretreatment of the aralkyl hydrocarbon, such as, for example, isopropyl benzene, in accordance with the invention, conditions in the pretreating zone may be controlled to effect the simultaneous production of, for example, diisopropyl benzene.

The aralkyl hydrocarbon-containing effluence emanating from the pretreating zone is subjected to suitable product separating means to recover the desired aralkyl hydrocarbon as a relatively concentrated stream, or in a relatively pure form, therefom. Such separating means may comprise one or more such steps as, for example, distillation, fractionation, solvent extraction, and the like. The pretreated aralkyl hydrocarbons thus obtained are then sent to the second, the oxidation, step of the process wherein they are oxidized to the corresponding aralkyl hydroperoxides as described hereinabove.

The aralkyl hydrocarbon pretreated in accordance with the invention may be subjected to further treatment within the scope of the invention prior to being subjected to the oxidation conditions. Thus, the aralkyl hydrocarbon after treatment with the clay type cracking catalyst may be brought into contact with a suitable chemical treating agent such as, for example, a mineral acid, for example, concentrated sulfuric acid. After contact with the acid, the acid-treated aralkyl hydrocarbon is preferably washed with water and with an alkaline material such as, for example, aqueous sodium carbonate, aqueous sodium hydroxide, or the like.

Illustrative of the substantial improvement obtained in the oxidation of the aralkyl hydrocarbons by combining the oxidation step with the pretreatment with a clay type cracking catalyst preferably in the presence of added propylene, as reflected by increase in yield of desired aralkyl hydroperoxide, is evidenced by the following examples.

EXAMPLE I

A sample of commercial cumene was subjected to distillation to remove higher and low boiling materials therefrom. The distilled cumene thus obtained was identified by the designation Sample No. 1.

A separate portion of commercial cumene was contacted with a silica-alumina cracking catalyst at a temperature of 200° C. in the presence of propylene at a temperature of 200° C. and a pressure of about 60 atmospheres. The propylene was added in an amount equal to about 0.01% by weight of the cumene. The treated cumene thus obtained was distilled to separate materials higher and lower boiling than cumene therefrom, and the distilled treated cumene thus obtained was identified by the designation Sample No. 2.

In a third and separate operation, a portion of commercial cumene was treated with a clay type cracking catalyst under conditions substantially identical to those employed in the preparation of the Sample No. 2, but with the exception that addition of propylene during the treating operation was omitted.

The silica-alumina cracking catalyst employed in the pretreatment of cumene in the preparation of Sample Nos. 2 and 3 was found to undergo a loss of 1.5% by weight upon being heated to 900° C. The composition of the catalyst after such heating was found to be: 11.6% by weight $Al_2O_3$, 88.4% by weight of $SiO_2$. Iron, sodium, potassium and calcium were found to be present in trace amounts.

In each of three separate oxidation runs conducted under essentially identical conditions, 200 grams of the cumene samples identified by the designations Nos. 1, 2 and 3, respectively, were oxidized by passing a stream of oxygen through the cumene at a temperature of 120° C., at a rate of 25 liters of oxygen per hour. The oxidation was carried out in a copper vessel while stirring. Pyridine was added to the charge in an amount equal to 0.025% by weight of the cumene.

The results obtained in each of the three separate oxidation runs are shown in the following Table A:

Table A

| Charge | Type of Pretreatment | Yield of Cumene Hydroperoxide in Percent by Weight |
| --- | --- | --- |
| Sample No. 1 | Distillation | 0.3 |
| Sample No. 2 | Cracking catalyst in presence of propylene. | 36.6 |
| Sample No. 3 | Cracking catalyst, no propylene | 3.3 |

EXAMPLE II

A portion of the treated cumene identified by the designation Sample No. 2, pretreated as described in the foregoing Example I was treated with 96% concentrated sulfuric acid prior to oxidation. The oxidation was carried out under the oxidation conditions described in the foregoing Example I with the exception that the pyridine promoter was omitted. The yield of cumene hydroperoxide thus obtained amounted to 21.7% by weight.

I claim as my invention:

1. In a process for the production of an alpha-alkyl benzyl hydroperoxide-containing reaction mixture by the reaction of an alpha-alkyl methyl benzene hydrocarbon with oxygen, the improvement which comprises contacting said alpha-alkyl methyl benzene hydrocarbon with siliceous cracking catalyst in the presence of from about 0.01 to about 1% by weight, based upon said alpha-alkyl methyl benzene hydrocarbon, of propylene at a temperature of from about 150 to about 350° C. before reacting said alpha-alkyl methyl benzene hydrocarbon with oxygen.

2. In a process for the production of an alpha-alkyl benzyl hydroperoxide-containing reaction mixture by the reaction of an alpha-alkyl methyl benzene hydrocarbon with oxygen, the improvement which comprises passing said alpha-alkyl methyl benzene hydrocarbon through a fixed bed of siliceous cracking catalyst in the presence of from about 0.01 to about 1% by weight, based upon said alpha-alkyl methyl benzene hydrocarbon, of propylene at a temperature of from about 150 to about 350° C., before reacting said alpha-alkyl methyl benzene hydrocarbon with oxygen.

3. In a process for the production of an alpha,alpha-dialkyl benzyl hydroperoxide-containing reaction mixture by the reaction of an alpha,alpha-dialkyl methyl benzene hydrocarbon with oxygen, the improvement which comprises passing said alpha,alpha-dialkyl methyl benzene hydrocarbon through a fixed bed of siliceous cracking catalyst containing from about 85 to about 90% $SiO_2$ and from about 15 to about 10% by weight of $Al_2O_3$ in the presence of from about 0.01 to about 1% by weight, based upon said dialkyl methyl benzene hydrocarbon, of propylene at a temperature in the range of from about 150 to about 350° C., before reacting said alpha,alpha-dialkyl methyl benzene hydrocarbon with oxygen.

4. In a process for the production of an isopropyl benzene hydroperoxide-containing reaction mixture by the reaction of an isopropyl benzene hydrocarbon with oxygen, the improvement which comprises passing said isopropyl benzene hydrocarbon through a fixed bed of siliceous cracking catalyst containing from about 85 to about 90% $SiO_2$ and from about 15 to about 10% by weight of $Al_2O_3$ in the presence of from about 0.01 to about 1% by weight, based upon said isopropyl benzene hydrocarbon, of propylene at a temperature in the range of from about 150 to about 350° C., before reacting said isopropyl benzene with oxygen.

5. In a process for the production of an isopropyl benzene hydroperoxide-containing reaction mixture by the reaction of isopropyl benzene with an oxygen-containing gas, the improvement which comprises passing said isopropyl benzene in the vapor phase through a fixed bed of siliceous cracking catalyst containing from about 85 to about 90% of $SiO_2$ and from about 15 to about 10% of $Al_2O_3$ by weight in the presence of from about 0.01 to about 1% by weight, based upon said isopropyl benzene, of propylene at a temperature in the range of from about 180 to about 350° C. and at a pressure of from about 15 to about 150 pounds, before reacting said isopropyl benzene with said oxygen-containing gas.

6. In a process for the production of an isopropyl benzene hydroperoxide-containing reaction mixture by the reaction of isopropyl benzene with an oxygen-containing gas, the improvement which comprises passing said isopropyl benzene in the liquid phase through a fixed bed of siliceous cracking catalyst containing from about 85 to about 90% of $SiO_2$ and from about 15 to about 10% of $Al_2O_3$ by weight in the presence of from about 0.01 to about 1% by weight, based upon said isopropyl benzene, of propylene at a temperature in the range of from about 150 to about 300° C. and at a pressure above about 500 pounds, before reacting said isopropyl benzene with said oxygen-containing gas.

7. In a process for the production of an isopropyl benzene hydroperoxide-containing reaction mixture by the reaction of isopropyl benzene with an oxygen-containing gas, the improvement which comprises forming a slurry by admixing said isopropyl benzene with siliceous cracking catalyst containing from about 85 to about 90% $SiO_2$ and from about 15 to about 10% of $Al_2O_3$ by weight, and passing said slurry in the liquid phase in the presence of from about 0.01 to about 1% by weight based upon said isopropyl benzene, of propylene through a treating zone maintained at a temperature in the range of from about 150 to about 300° C. and at a pressure above about 500 pounds, before reacting said isopropyl benzene with said oxygen-containing gas.

References Cited in the file of this patent

FOREIGN PATENTS 719,895    Great Britain _____ Dec. 8, 1954